United States Patent
Kilickiran et al.

(10) Patent No.: US 8,568,614 B2
(45) Date of Patent: *Oct. 29, 2013

(54) BLUE PHASE LIQUID CRYSTAL COMPOSITION WITH REDUCED HYSTERESIS BEHAVIOR

(75) Inventors: Pinar Kilickiran, Stuttgart (DE); Gabriele Nelles, Stuttgart (DE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,835

(22) Filed: Mar. 5, 2012

(65) Prior Publication Data

US 2012/0235088 A1 Sep. 20, 2012

(30) Foreign Application Priority Data

Mar. 18, 2011 (EP) .................................... 11002263

(51) Int. Cl.
*C09K 19/00* (2006.01)
*C09K 19/06* (2006.01)
*C09K 19/30* (2006.01)
*C09K 19/52* (2006.01)
*C09K 19/54* (2006.01)
*C09K 19/20* (2006.01)

(52) U.S. Cl.
USPC .............. 252/299.01; 252/299.6; 252/299.63; 252/299.67; 252/299.5; 428/1.1

(58) Field of Classification Search
USPC .............. 252/299.01, 299.6, 299.63, 299.67, 252/299.5; 428/1.1
See application file for complete search history.

(56) References Cited

U.S. PATENT DOCUMENTS 7,576,829 B2 * 8/2009 Kikuchi et al. ............... 349/175
2011/0240917 A1 * 10/2011 Kilickiran et al. ......... 252/299.6

* cited by examiner

*Primary Examiner* — Geraldina Viscounti
(74) *Attorney, Agent, or Firm* — Oblon, Spivak, McClelland, Maier & Neustadt, L.L.P.

(57) ABSTRACT

The present invention relates to a blue phase (BP) liquid crystal composition that shows reduced hysteresis behavior, and to a method of reducing and/or eliminating the hysteresis behavior of a BP liquid crystal composition. Moreover, the present invention relates to a blue phase liquid crystal composition, wherein the hysteresis has been reduced or eliminated. Furthermore, the present invention relates to a liquid crystal cell comprising a blue phase liquid crystal composition, and to a liquid crystal display comprising a blue phase liquid crystal composition.

14 Claims, 7 Drawing Sheets

BLUE PHASE LIQUID CRYSTAL COMPOSITION WITH REDUCED HYSTERESIS BEHAVIOR

The present invention relates to a blue phase (BP) liquid crystal composition that shows reduced hysteresis behavior, and to a method of reducing and/or eliminating the hysteresis behavior of a BP liquid crystal composition. Moreover, the present invention relates to a blue phase liquid crystal composition, wherein the hysteresis behavior has been reduced or eliminated. Furthermore, the present invention relates to a liquid crystal cell comprising a blue phase liquid crystal composition, and to a liquid crystal display comprising a blue phase liquid crystal composition.

Liquid crystalline blue phases are self-assembled cubic structures which are composed of helically double twisted cylinders. This type of structure is limited to a very narrow temperature range of approximately 1-2° C. To make use of such liquid crystalline blue phases in display applications, the blue phase (BP) must be brought into a state where it is stable over a larger temperature range. In recent years, based on the work of Kikuchi et al., ways have been found to extend the temperature range of blue phase liquid crystals to more than 60° C., wherein the blue phase is stabilized by the help of a polymer network. Coles et al. developed novel bimesogenic materials which yielded temperature ranges of approximately 50° C. over which the blue phase state of a liquid crystal material exists.

A liquid crystalline blue phase is an optically isotropic phase which, upon application of an electric field and based on the Kerr effect, becomes birefringent, and, due to the refractive index distribution of the liquid crystal, turns into an optically anisotropic state which is unlike other liquid crystal phases which are switching from one anisotropic state to another. If the blue phase is brought between two crossed polarizers, the transmittance increases with increase of the voltage. This operation requires application of a considerable voltage as it links up to the induced birefringence which itself is highly dependent on the Kerr constant of the liquid crystal material and also on the strength of the electric field. Although the broadening of the stability temperature range of a blue phase liquid crystal material represents an advancement, there are still drawbacks associated with blue phase liquid crystal materials, such as the high operating voltage which needs to be applied to make the blue phase switch from a dark to a bright state, a relatively low transmittance and the fact that the temperature ranges are still not wide enough for practical applications in displays. Different approaches have been taken to improve the above-mentioned aspects, such as for example by means of an optimization of the electrode structure, a tuning of the liquid crystal and chiral materials, an improvement of the polymer network by using multifunctional monomers.

When a blue phase liquid crystal display is switched between a dark and a bright state, the liquid crystal material switches between an optically isotropic state and an anisotropic state. The application of an electric field induces a birefringence. Although the microscopic structure of the formed liquid crystal phase upon induced birefringence is not well understood, it is, however, macroscopically treated as the Kerr effect in isotropic materials, which essentially is an electric field-induced reorientation of polar molecules. When a blue phase liquid crystal composition is subjected to the application of an electric field, commonly a hysteresis behavior is observed. This means that the light transmittance of the liquid crystal composition depends not only on the specific electric field applied, but also on the state that the liquid crystal composition had before with respect to its light transmittance. Thus, a different light transmittance will be observed for a liquid crystal composition in an electric field that was established by increasing the strength of a previously applied weaker electric field compared to the same liquid crystal composition in an electric field of exactly the same strength that was established by reducing the strength of a previously applied stronger electric field.

Figure 1:
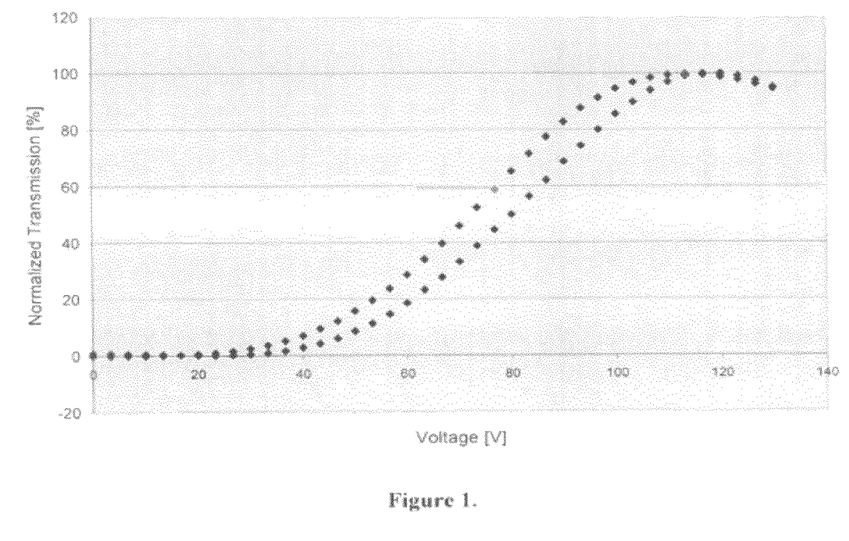
FIG. 1 shows a transmittance-vs.-voltage-plot of a first blue phase test display which is prepared using the mixture of table 1 above.

An example is given in FIG. 1 where the transmittance-voltage curve of a display shows severe hysteresis. This display is prepared by using an in-literature reported BP mixture (table 1) and conditions (H. Kikuchi, M. Yokota, Y. Hisakado, H. Yang, T. Kajiyama; Nature materials, Vol. 1, 64-68, 2002). In this mixture JC-1041XX® and 5CB® are commercial LC materials. ZLI-4572 is a commercial chiral material of the formula $C_{44}H_{58}O_4$. RM257® & EHA are the commercial reactive monomers and finally the DMPAP® is a commercial photo initiator. JC-1041XX® was obtained from Chisso, Japan; 5CB®, EHA® and DMPAP® were obtained from Aldrich, Germany; and RM257® and ZLI-4572® were obtained from Merck, Germany.

TABLE 1

Figure 2:
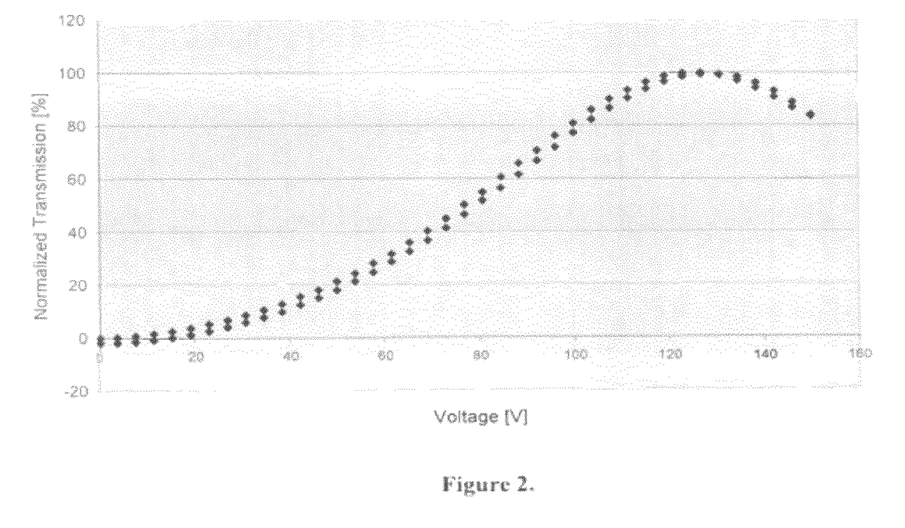
FIG. 2 shows a transmittance-vs.-voltage-plot of a second blue phase test display also prepared using the same mixture of table 1. In comparison to FIG. 1, this test display shows better hysteresis behavior, even though the same mixture and same stabilization conditions are used.
Figure 3:
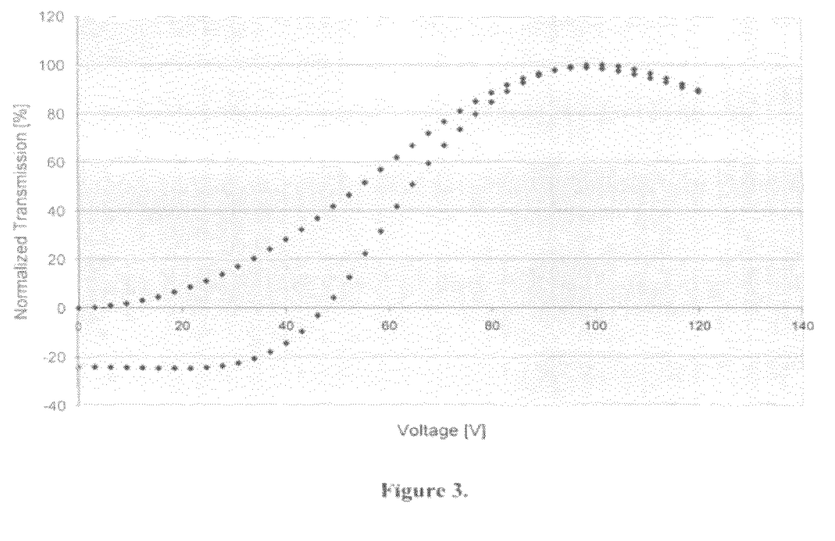
FIG. 3 shows a transmittance-vs.-voltage-plot of a third blue phase test display which has also been prepared using the same mixture of table 1 above. In comparison to FIGS. 1 and 2, this test display, however, shows much worse hysteresis behavior.

The BP phase mixture used in the measured displays shown in FIGS. 1-3.

| | Material | | | | | |
|---|---|---|---|---|---|---|
| | JC-1041XX ® | 5CB ® | ZLI-4572 ® | RM257 ® | EHA (2-ethylhexyl-acrylate) | DMPAP (2,2-dimethoxy-2-phenyl acetophone) |
| Amount (mol %) | 44.23 | 43.84 | 4.71 | 2.79 | 3.90 | 0.52 |

FIGS. 2 and 3 show two other transmittance voltage curves where the same blue phase mixture as in FIG. 1 is used and again the same conditions are applied. In FIG. 2, while the hysteresis is lower in comparison to the rest of the figures, in FIG. 3 it is much more severe. These results show that the hysteresis is quite unpredictable. It is very difficult to use such materials in real display devices, because the manufacturing failures will be too unpredictable. To solve this problem more reliable materials which facilitate the BP formation is needed.

Current electronic device display technologies require displays with a high brightness and contrast, low power consumption and very fast response times for application fields such as three-dimensional displays or field sequential displays. Incorporating liquid crystalline blue phase materials into displays offers the potential to meet several of theses requirements, but still the issue of hysteresis of these blue phases need to be resolved.

Accordingly, it was an object of the present invention to provide for means to reduce and/or eliminate the hysteresis behavior of a blue phase liquid crystal composition.

The objects of the present invention are solved by a liquid crystal composition comprising:
- a liquid crystal material capable of forming a blue phase,
- at least one crosslinking monomer and/or endcapping monomer having a chiral side chain of a defined chiral pitch.

In one embodiment the liquid crystal composition according to the present invention, further comprises a chiral dopant, not attached to any crosslinking and/or endcapping monomer.

In one embodiment said chiral dopant has a defined chiral pitch which is the same as the defined chiral pitch of said chiral side chain.

In one embodiment said chiral dopant has a structure which includes said chiral side chain.

In one embodiment said at least one crosslinking monomer having a chiral side chain of a defined chiral pitch has a general structure represented by wherein the individual symbols mean:

Backbone of crosslinker molecule/monomer

Chiral side chain

In one embodiment said at least one endcapping monomer having a chiral side chain of a defined chiral pitch has a general structure represented by wherein the individual symbols mean:

Backbone of end-capping molecule/monomer

Chiral side chain

In one embodiment, said at least one crosslinking monomer having a chiral side chain of a defined chiral pitch is RM257® linked to ZLI-4572®.

In one embodiment, said at least one end-capping monomer having a chiral side chain of a defined chiral pitch is EHA linked to ZLI-4572®.

In one embodiment, said chiral dopant is ZLI-4572®.

In one embodiment said defined chiral pitch of said chiral side chain is in the range of from 1 to 400 nm, preferably from 100 to 400 nm, more preferably from 200 to 400 nm.

The objects of the present invention are also solved by a method of reducing and/or eliminating hysteresis behavior of a blue phase liquid crystal composition, said method comprising the steps:
a) providing a liquid crystal material capable of forming a blue phase,
b) adding to said liquid crystal material capable of forming a blue phase at least one crosslinking and/or endcapping monomer having a chiral side chain of a defined chiral pitch, said crosslinking monomer, said endcapping monomer, said chiral side chain, and said defined chiral pitch being as defined above,
c) inducing polymerization of said monomer(s), under conditions where a blue phase state of said liquid crystal material exists.

In one embodiment, the method according to the present invention, further comprises the step b') adding to said liquid crystal material capable of forming a blue phase at least one chiral dopant, not attached to any crosslinking and/or endcapping monomer, said chiral dopant being as defined above, wherein steps b) and b') are performed in any order after step a) and before step c).

The objects of the present invention are also solved by a blue phase liquid crystal composition, wherein the hysteresis behavior of the blue phase liquid crystal composition has been reduced or eliminated by the method according to the present invention.

The objects of the present invention are also solved by a liquid crystal cell comprising a blue phase liquid crystal composition according to the present invention.

The objects of the present invention are also solved by a liquid crystal display comprising a blue phase liquid crystal composition or a liquid crystal cell according to the present invention.

As used herein, the term "blue phase" is meant to refer to a state of a liquid crystal material or composition, wherein double twist structures occur over extended dimensions. In one embodiment, such blue phase state is a self-assembled three-dimensional cubic defect structure of a liquid crystal material/composition.

As used herein, the term "hysteresis behavior" of a blue phase liquid crystal composition is meant to refer to a hysteresis behavior as observed in a transmittance-vs.-voltage-plot. In one embodiment, such term refers to the hysteresis of light transmittance of a material, in this case, of the aforementioned blue phase liquid composition, which is observed upon application and subsequent removal of an electric field to such material.

The term "chiral pitch", as used herein, refers to the distance over which a liquid crystal molecule undergoes a full 360° twist. It should be noted, however, that the structure of a chiral nematic phase repeats itself every half-pitch, since in this phase, the directors at 0° and ±180° are equivalent. The pitch typically changes when the temperature is altered or when other molecules are added to the liquid crystal host. For example a non-chiral liquid crystal host material will form a chiral phase if doped with a chiral material. If molecules are added to the liquid crystal host, this allows the pitch of said liquid crystal host to be tuned accordingly. In accordance with embodiments of the present invention, the chiral side chain of a defined chiral pitch is attached to the cross linking monomer and/or the end-capping monomer, and the defined chiral pitch of the chiral side chain causes the liquid crystal material to undergo a twist, which, under defined conditions, for example in a specified temperature range, then leads to the blue phase formation.

A liquid crystal material capable of forming a blue phase, as used herein, is a liquid crystal material which, under defined conditions, may form such blue phase. Typically, this is a defined temperature range. A person skilled in the art will be able to determine and identify liquid crystal materials capable of forming a blue phase. In one embodiment, such liquid crystal material is a positive type nematic liquid crystal material which additionally includes a chiral dopant material. Such liquid crystal material may also be a mixture of various liquid crystal compounds. Blue phase liquid crystal materials are also commercially available from a variety of sources. A commercially available example of a blue phase liquid crystal material is JC-1041xx®, which is a mixture of various positive type nematic liquid crystal compounds. An example of a chiral dopant material is ZLI-4572®.

In accordance with the present invention, the liquid crystal material capable of forming a blue phase is a mixture of liquid crystalline compounds and one or more chiral materials. In accordance with the present invention, said chiral material(s) is (are) provided in the form of one or several monomers having a chiral side chain. A person skilled in the art will be able to determine whether or not a liquid crystal mixture forms a blue phase, by simply raising the temperature of the liquid crystal material and subsequently lowering it again under defined conditions and measuring or observing the light transmission during the phase transition from the isotropic phase to a chiral nematic phase or vice versa.

The term "5CB®" refers to 4-cyano 4'-pentyl biphenyl.

The term "crosslinking monomer" and "monomer for crosslinking", as used herein, is meant to refer to a monomer which has at least two chemical functionalities which allow this monomer to polymerize or crosslink in a polymerization reaction. Typically, a crosslinking monomer is at least bifunctional, i.e. it has at least two functional groups with which it can react in a polymerization reaction. Examples for such "crosslinking monomer" are diacrylate monomers, divinyl monomers etc. A specific commercial available example of a diacrylate monomer is RM257®. The term "endcapping monomer" or "monomer for endcapping" is meant to refer to a monomer which reacts with the polymer at its still reactive parts and by this way stops the polymerization at those sites of the polymer. Typically, an endcapping monomer is monofunctional, i.e. it has only one functional group with which it can react in a polymerization reaction. The endcapping units are used to make sure that when a polymer is obtained it no longer has reactive (polymerizable) units left which in applications such as a display can cause reliability issues.

The term "polymerizable monomer" is meant to refer to any monomer which can be polymerized. Sometimes, herein, the term is used interchangeably with a "crosslinking monomer". Such polymerization can be initiated by exposing such monomer to appropriate conditions for initiation of polymerization. Such conditions may for example be heat, irradiation with electromagnetic radiation, such as UV or UV-VIS. In a preferred embodiment, the polymerizable monomers in accordance with the present invention are UV-polymerizable monomers.

The present inventors have surprisingly found that, by including in the liquid crystal material mixture which is capable of forming a blue phase, at least one crosslinking monomer and/or endcapping monomer which has at least one chiral side chain of a defined chiral pitch, it is possible to reduce or even eliminate the hysteresis behavior which the blue phase liquid crystal composition would otherwise show in the absence of such chiral side chain being attached to the crosslinking monomer and/or endcapping monomer, where the chirality might just be induced by a free chiral dopant being present. As used herein, a "free chiral dopant" refers to a chiral dopant which is not attached to any crosslinking monomer and/or endcapping monomer. A blue phase liquid crystal composition having a reduced or eliminated hysteresis is a blue phase liquid crystal composition for which a reduced or eliminated hysteresis, e.g. of light transmittance, is observed, e.g. in a transmittance-vs.-voltage-plot in comparison to the same blue phase liquid crystal composition wherein none of the crosslinking and/or endcapping monomers has a chiral side chain attached. Thus, to detect such reduced or eliminated hysteresis, the blue phase liquid crystal composition in which chirality is induced by the chiral side chains of the polymer is compared to a reference liquid crystal composition which is the same blue phase liquid crystal composition with the only difference that the chirality of this reference liquid crystal composition is not induced by chiral polymer side chains, but by the presence of a free chiral dopant only.

As used herein, the term "chiral side chain" is meant to refer to a side chain of a monomer which has at least one asymmetric carbon atom in its structure and which has a certain chiral pitch which leads the liquid crystals to undergo the twist which at a certain temperature then leads to the blue phase formation. This chiral side chain will, upon polymerization of the respective monomer, end up in a polymer having chiral side chain(s).

In accordance with embodiments of the present invention, the chiral side chain is covalently attached to the crosslinking monomer and/or endcapping monomer.

As used herein, the term "chiral pitch", p, refers to the distance over which a liquid crystal molecule undergoes a full 360° twist (but note that the structure of the chiral nematic phase repeats itself every half-pitch, since in this phase directors at 0° and ±180° are equivalent). The chiral pitch typically changes when the temperature is altered or when other molecules are added to the liquid crystal host (an achiral liquid crystal host material will form a chiral phase if doped with a chiral material), allowing the pitch of a given material to be tuned accordingly. In some liquid crystal systems, the pitch is of the same order as the wavelength of visible light. This causes these systems to exhibit unique optical properties, such as Bragg reflection.

Typical values of the defined chiral pitch in accordance with the present invention lie in the range of from 1 to 400 nm, preferably from 100 to 400 nm, more preferably from 200 to 400 nm.

The present inventors have surprisingly found that it is possible to reduce and/or even eliminate the hysteresis behavior mentioned above in a blue phase liquid crystal composition, if chirality is induced by the presence of one or several polymers/polymer types which have chiral side chains attached. As opposed to the prior art, where chirality is induced by the presence of a free chiral dopant, the chirality in the present invention comes about by the presence of chiral side chains being attached to one (or several) monomer(s) which subsequently undergo polymerization. Such monomer may be a crosslinking monomer or an endcapping monomer or both. In addition to such chiral side chains being attached to one (or several) monomer(s), the blue phase liquid crystal composition may additionally also comprise a free chiral dopant. If such free chiral dopant is present, it may include the same chemical structure that is also present in the chiral side chains which are attached to the respective monomers. In one embodiment, the free chiral dopant comprises the same chemical structure as the structure of the chiral side chain. In another embodiment, the free chiral dopant consists of the same chemical structure of the chiral side chain, except for that it is not attached to any monomer/polymer.

Without wishing to be bound by any theory, the present inventors believe that using polymerizable reactive monomers, i.e. crosslinking monomers or endcapping monomers or both, having a chiral side chain attached, and subsequently polymerizing such monomers, it is possible to provide a twist information to the liquid crystal composition which twist information is more stable than the twist information that would otherwise be provided if only a free chiral dopant was present. Hence, the resultant polymer network with chiral side chains acts as a constant "memory" for twist information. Such twist information is, however, important and necessary for the formation of a blue phase state. Because such twist information is "fixed", due to the chiral side chain being attached to a, typically solid, polymer, such twist information is conserved and can therefore be reliably used for the formation of a blue phase state.

In the following, reference is made to the figures, wherein

FIG. 5 shows a double helix which is called "double helix" even though there may be an infinite number of possible helical axes; moreover FIG. 5 shows a perspective view on the double twist cylinder;

Moreover, reference is now made to the following example which is given to illustrate, not to limit the present invention.

EXAMPLE

Rationale Underlying the Present Invention and Prior Art Hysteresis

Without wishing to be bound any theory, the present inventors believe that the hysteresis problem that is observed in blue phase liquid compositions very likely arises because of the many components used in a blue phase liquid crystal composition.

Provided that a full polymerization of the reactive monomers are achieved, the only free components remaining in the liquid crystal (LC) mixture (other than the LC) itself will be the chiral material which is used in around 5 mol % and the photo initiator which is used in 0.5 mol % or even less. The amounts alone suggest that a possible candidate causing the hysteresis problem can be the chiral material which facilitates the BP formation. Another possible drawback of having a so-called free chiral material in an LC mixture can be seen when the temperature behavior of the nematic to isotropic transition temperatures of the LC with and without chiral material is measured. The results can be followed from table 2, where the amount of liquid crystal components are held constant in both cases, with the difference that in the second case we used 4.71 mol % of chiral material ZLI-4572. The nematic to isotropic phase transition temperature decreases about 7° C. with the addition of chiral material.

TABLE 2

Phase transition temperatures of same nematic LC mixture without and with chiral material.

|  | $T_{Cr-N}$ (° C.) | $T_{N-Iso}$ (° C.) |
|---|---|---|
| No chiral material | −65.5° C. | 56.4° C. |
| 4.7% chiral material | −63.4° C. | 49.3° C. |

(Cr = crystal (i.e. solid); N = nematic; Iso = isotropic)

As chiral material is essential to achieve a blue phase, it is impossible to make a comparison as above for blue phase transition temperature, or for the stable temperature range of a blue phase. However, it is safe to assume that if, at least to some extent, solid supported chiral material instead of free chiral material could be used, then the BP transition temperature would also change. Also, it is very reasonable to conclude that existence of a free chiral material in an LC mixture complicates the situation in terms of hysteresis, for example, when we think that the chiral material moves together with the LC material when an electrical field is applied and after the electric field is removed it no longer stays at the exact same position as it was staying initially, still forming the double twist but which perhaps stays at a different angle, changing the light transmittance properties.

Accordingly, the present invention is about using polymerizable reactive monomers (RMs) with chiral side chains to provide twist information to the LC mixture which is the most crucial info for BP formation.

As a result, the objectives of the invention are to use reactive monomers with chiral side chains to decrease the hysteresis, whereby the present inventors suggest that the temperature range of BP will also be increasing. Also, it is possible that because the existence of fixed chiral information will facilitate and even speed-up the returning back to the original BP, the response speed will also improve.

Figure 4:
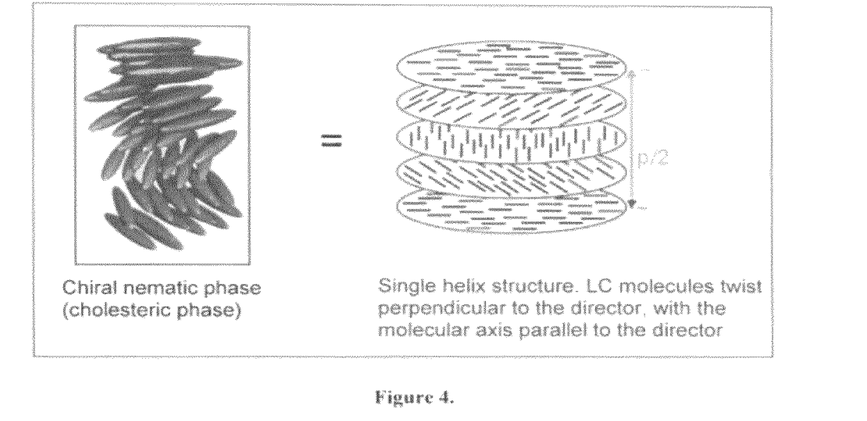
FIG. 4 shows a graphical representation of a chiral nematic phase which forms a single helix structure. In the single helix structure, the liquid crystal molecules twist perpendicular to the director, with the molecular axis being parallel to the director.
Figure 5:
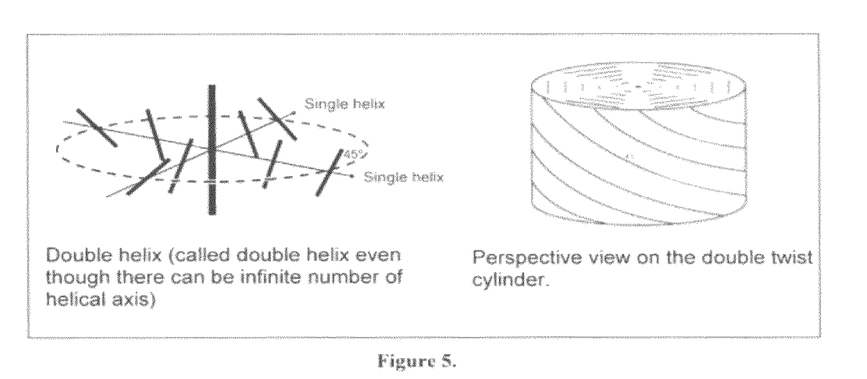
Figure 6:
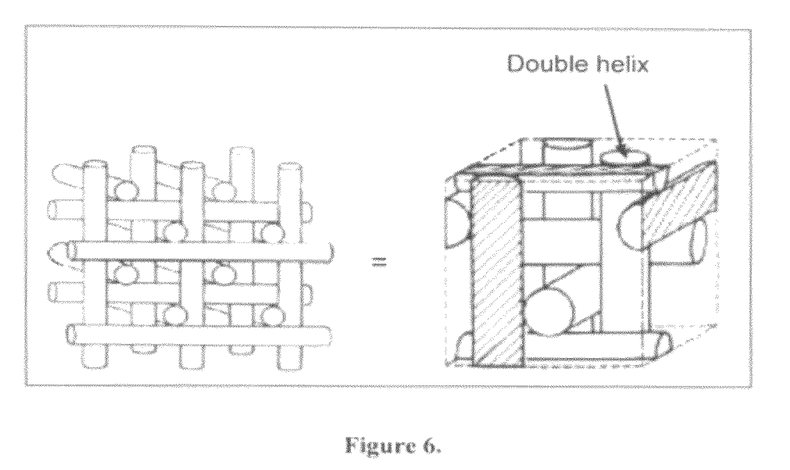
FIG. 6 shows a graphical representation of a blue phase state.

When looking at the in-literature documented organization of cholesteric LC (FIG. 4), double helix structure (FIG. 5) and cubic BP (FIG. 6), the possibility arises that still some further free chiral material in the LC mixture, may be needed because a chiral information that comes first from the monomer, and after polymerization from the polymer may not be enough to twist the entire nematic arrangement throughout the initial LC bulk. However, using chiral side chain monomers/polymers will considerably decrease the necessity of free chiral material, which will have a positive effect on the overall hysteresis, temperature range and response speeds.

Figure 7:
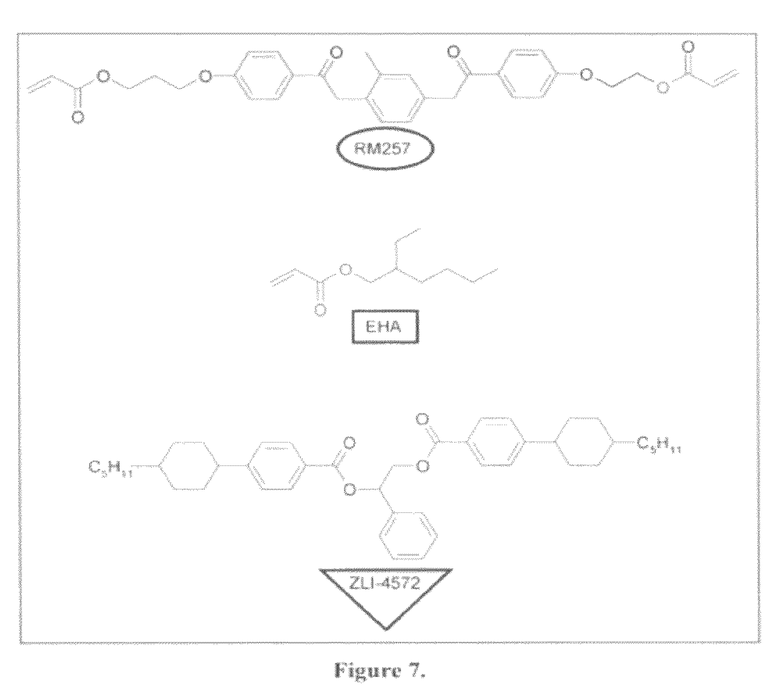
FIG. 7 shows structures of reactive monomers and chiral materials used in a representative blue phase liquid crystal mixture of table 1 above.
Figure 8:
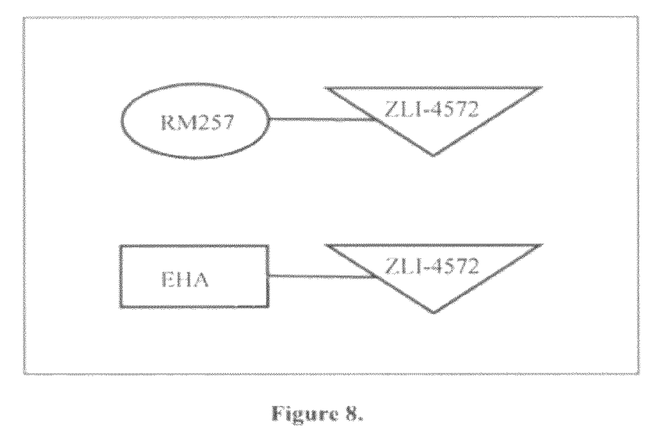
FIG. 8 shows a schematic representation of reactive monomers with a chiral side chain, wherein the molecules are put together from the example structures depicted in FIG. 7.
Figure 9:
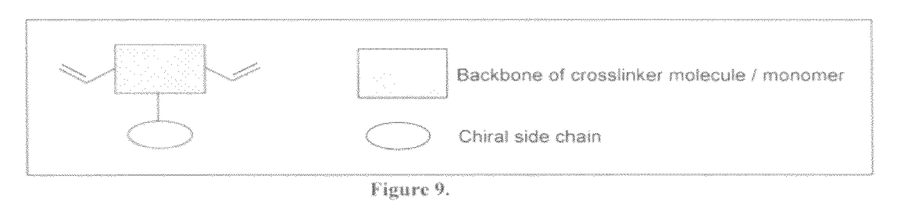
FIG. 9 shows the general structure of a crosslinking monomer having a chiral side chain attached anywhere.
Figure 10:
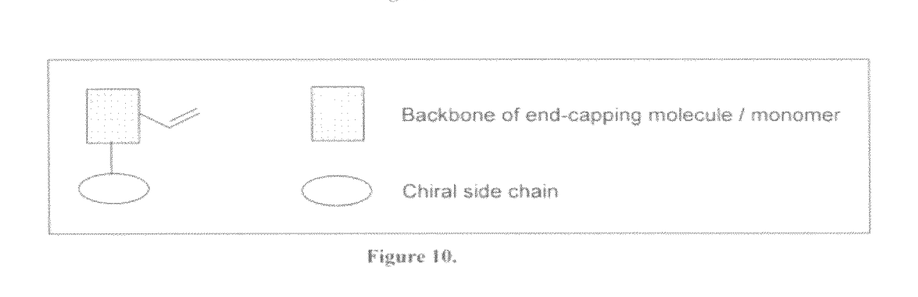
FIG. 10 shows the general structure of an endcapping monomer having a chiral side chain attached anywhere.

The free chiral material and the chiral material which is attached to the monomer/polymer (solid support) as a side chain very likely need to have the same chiral pitch, very likely need to be the same material, the present invention is not limited thereto. For example, looking at the structures of monomers and the chiral material used in table 1 reported mixture (FIG. 7), then a possible schematic representation of monomers with chiral information may be imagined as shown in FIG. 8.

The features of the present invention disclosed in the specification, the claims and/or in the accompanying drawings, may, both separately, and in any combination thereof, be material for realising the invention in various forms thereof.

The invention claimed is:

1. A liquid crystal composition comprising:
    a liquid crystal material which forms a blue phase, and
    at least one crosslinking monomer having a chiral side chain of a defined chiral pitch and/or endcapping monomer having a chiral side chain of a defined chiral pitch.

2. The liquid crystal composition according to claim 1, further comprising a chiral dopant, not attached to any crosslinking and/or endcapping monomer.

3. The liquid crystal composition according to claim 2, wherein said chiral dopant has a defined chiral pitch which is the same as the defined chiral pitch of said chiral side chain.

4. The liquid crystal composition according to claim 3, wherein said chiral dopant has a structure which includes said chiral side chain.

5. The liquid crystal composition according to claim 1, wherein said at least one crosslinking monomer having a chiral side chain of a defined chiral pitch present and has a general structure represented by wherein the individual symbols mean:

Backbone of crosslinker molecule/monomer

Chiral side chain.

6. The liquid crystal composition according to claim 1, wherein said at least one endcapping monomer having a chiral side chain of a defined chiral pitch is present and has a general structure represented by wherein the individual symbols mean:

Backbone of end-capping molecule/monomer

Chiral side chain.

7. The liquid crystal composition according to claim 1, wherein said defined chiral pitch of said chiral side chain is in the range of from 1 to 400 nm.

8. A method of reducing and/or eliminating hysteresis behavior of a blue phase liquid crystal composition, said method comprising:
    a) providing a liquid crystal material which forms a blue phase,
    b) adding to said liquid crystal material which forms a blue phase at least one crosslinking and/or endcapping monomer having a chiral side chain of a defined chiral pitch, said crosslinking monomer, said endcapping monomer, said chiral side chain, and said defined chiral pitch being as defined in claim 1,
    c) inducing polymerization of said monomer(s), under conditions where a blue phase state of said liquid crystal material exists.

9. The method according to claim 8, further comprising
    b') adding to said liquid crystal material which forms a blue phase at least one chiral dopant, not attached to any crosslinking and/or endcapping monomer, said chiral dopant being as defined in claim 2,
    wherein b) and b') are performed in any order after a) and before c).

10. A blue phase liquid crystal composition, wherein the hysteresis behavior of the blue phase liquid crystal composition has been reduced or eliminated by the method according to claim 8.

11. A liquid crystal cell comprising a blue phase liquid crystal composition according to claim 10.

12. A liquid crystal display comprising a blue phase liquid crystal composition according to claim 10 or a liquid crystal cell according to claim 11.

13. The liquid crystal composition according to claim 1, wherein said defined chiral pitch of said chiral side chain is in the range of from 100 to 400 nm.

14. The liquid crystal composition according to claim 1, wherein said defined chiral pitch of said chiral side chain is in the range of from 200 to 400 nm.

* * * * *